(12) United States Patent
Kuroda et al.

(10) Patent No.: US 11,261,633 B2
(45) Date of Patent: Mar. 1, 2022

(54) POWER SLIDE WINDOW

(71) Applicant: Yachiyo Industry Co., Ltd., Saitama (JP)

(72) Inventors: Atsushi Kuroda, Tochigi (JP);
Teruyuki Nakamura, Tochigi (JP);
Hirotaka Kamioka, Tochigi (JP);
Keiichiro Nakamura, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 17/261,617

(22) PCT Filed: Jul. 12, 2019

(86) PCT No.: PCT/JP2019/027725
§ 371 (c)(1),
(2) Date: Jan. 20, 2021

(87) PCT Pub. No.: WO2020/026768
PCT Pub. Date: Feb. 6, 2020

(65) Prior Publication Data
US 2021/0262263 A1    Aug. 26, 2021

(30) Foreign Application Priority Data

Jul. 31, 2018 (JP) .............................. JP2018-143175

(51) Int. Cl.
*E05D 15/06* (2006.01)
*E05F 15/60* (2015.01)
(Continued)

(52) U.S. Cl.
CPC .......... *E05D 15/066* (2013.01); *B60J 1/1853* (2013.01); *E05F 15/60* (2015.01); *E05F 5/003* (2013.01); *E05Y 2900/55* (2013.01)

(58) Field of Classification Search
None
See application file for complete search history.

(56) References Cited

U.S. PATENT DOCUMENTS 5,822,922 A * 10/1998 Grumm .................. B60J 1/1853
49/360
6,119,401 A * 9/2000 Lin ........................ B60J 1/1853
49/118
(Continued)

FOREIGN PATENT DOCUMENTS

| CN | 105026196 | 11/2015 |
| JP | 2003182354 | 7/2003 |

(Continued)

OTHER PUBLICATIONS

Chinese First Office Action (w/ English Translation) for corresponding Chinese Patent Application No. 2019-80042220.1, dated Apr. 16, 2021—11 pages.
(Continued)

*Primary Examiner* — Marcus Menezes
(74) *Attorney, Agent, or Firm* — Dority & Manning, P.A.

(57) ABSTRACT

To provide a power slide window in which the projecting dimension of the guide rail from the panel surface is small, the guide rail (4) defines a pin guide groove (26) that includes a groove main portion (26a) extending along a panel surface (2b) and at least one groove extension portion (26b) configured to drive a slide panel (3) in a direction to approach the window glass pane (2) via a pin (16) when the slide panel reaches the vicinity of the closed position. A slider guide groove (27) provided in the guide rail 4 to allow sliding of the slider 20 which is slidingly driven in the opening and closing direction and a groove main portion (26a) of a pin guide groove (26) are formed at least partially in common with each other.

5 Claims, 10 Drawing Sheets

(51) Int. Cl.
*B60J 1/18* (2006.01)
*E05F 5/00* (2017.01)

(56) References Cited

U.S. PATENT DOCUMENTS

| | | | | |
|---|---|---|---|---|
| 7,464,501 B2 * | 12/2008 | Arimoto | ............... | E05F 15/646 49/209 |
| 8,469,437 B2 * | 6/2013 | Zanetti | ................ | E05D 15/1047 296/146.16 |
| 8,769,872 B2 * | 7/2014 | Maltaverne | ................ | B60J 1/16 49/209 |
| 8,813,425 B2 * | 8/2014 | Ash, Jr | ................ | E05F 15/646 49/380 |
| 8,938,914 B2 * | 1/2015 | Hulst | ..................... | B60J 1/1853 49/413 |
| 9,027,282 B2 * | 5/2015 | Schreiner | ............ | E05D 15/1047 49/413 |
| 10,434,845 B2 * | 10/2019 | Murasawa | ............... | B60J 10/74 |
| 10,518,611 B2 * | 12/2019 | Murasawa | .............. | E05F 11/53 |
| 10,882,382 B2 * | 1/2021 | Otsubo | ................. | E05F 11/535 |
| 2009/0107052 A1 * | 4/2009 | Dufour | ................. | E05F 11/535 49/413 |
| 2011/0006558 A1 * | 1/2011 | Giret | .......................... | B60J 1/16 296/146.15 |
| 2019/0184793 A1 * | 6/2019 | Murasawa | .............. | E05F 11/53 |
| 2019/0194992 A1 * | 6/2019 | Murasawa | .............. | E05F 11/535 |

FOREIGN PATENT DOCUMENTS

| | | |
|---|---|---|
| WO | WO 2014/082312 | 6/2014 |
| WO | WO2018047614 | 3/2018 |

OTHER PUBLICATIONS

International Search Report and Written Opinion for PCT/JP/2019/027725 dated Aug. 27, 2019.

* cited by examiner

Fig.7
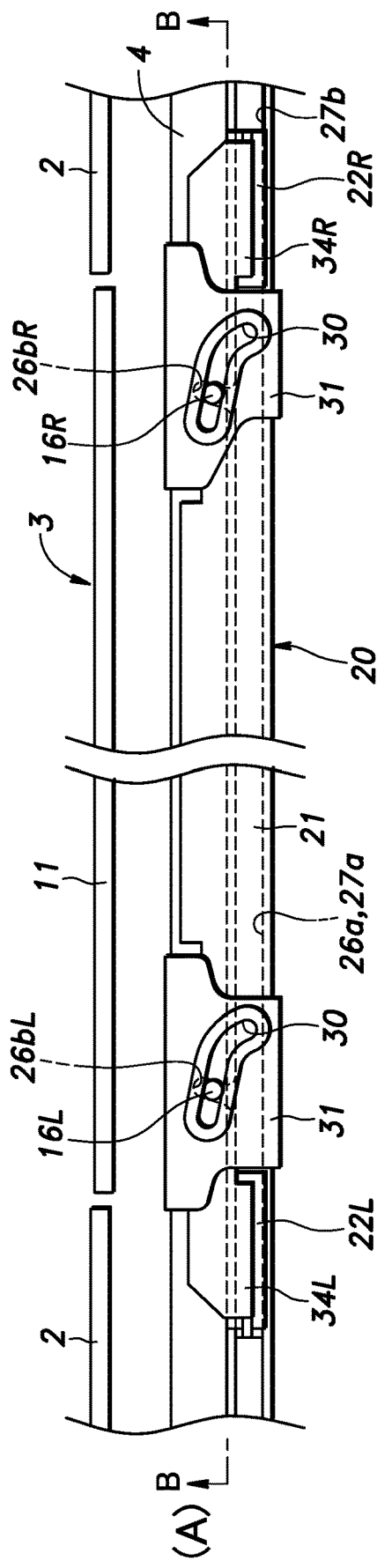
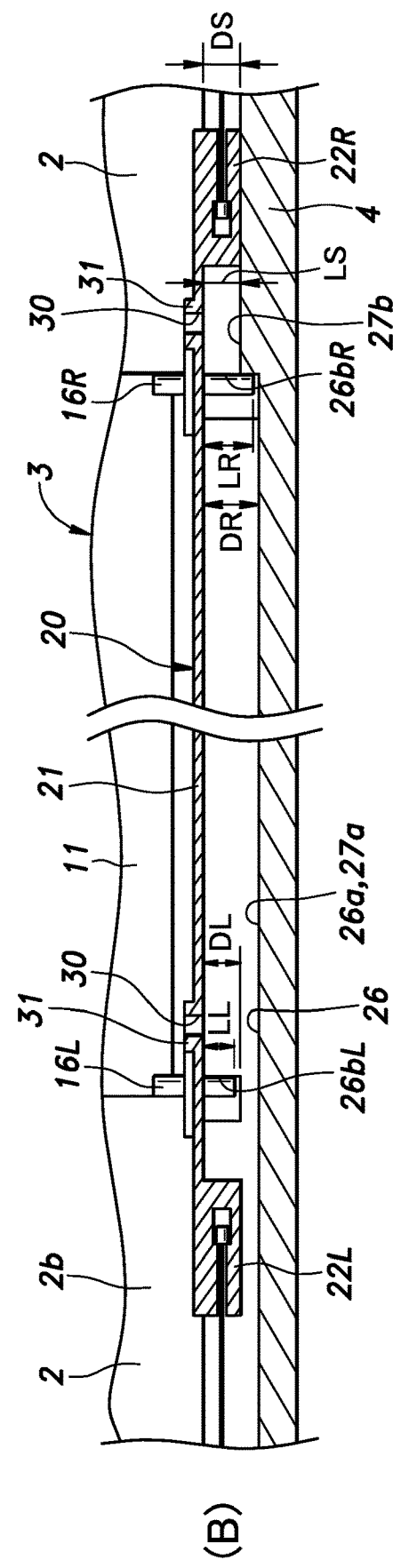

Fig.8
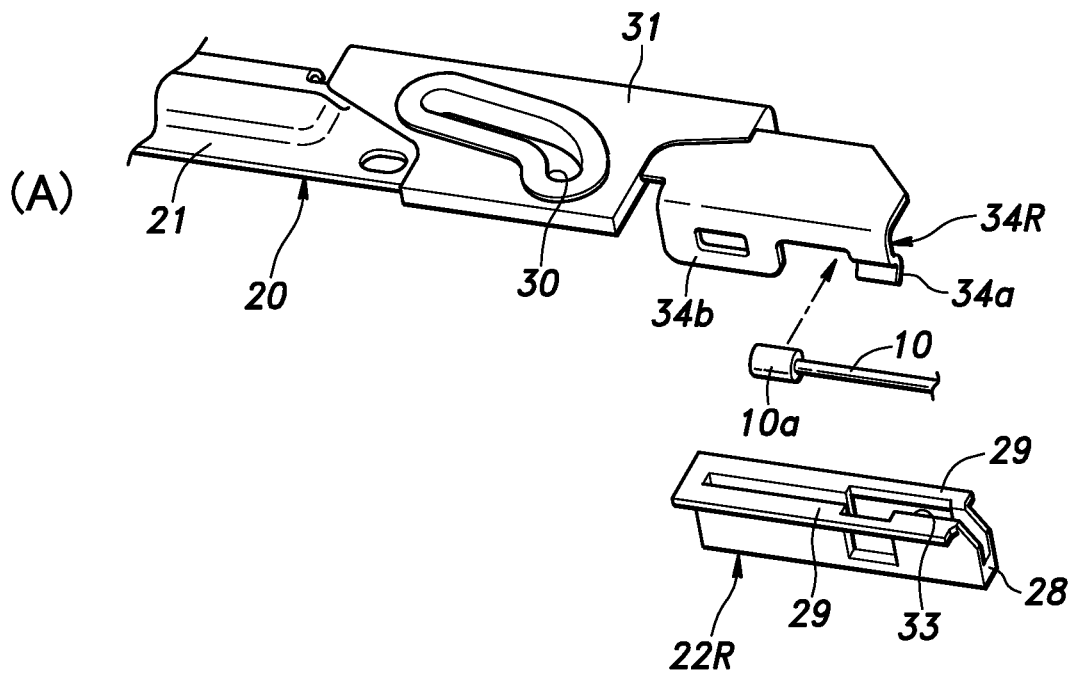
(A)
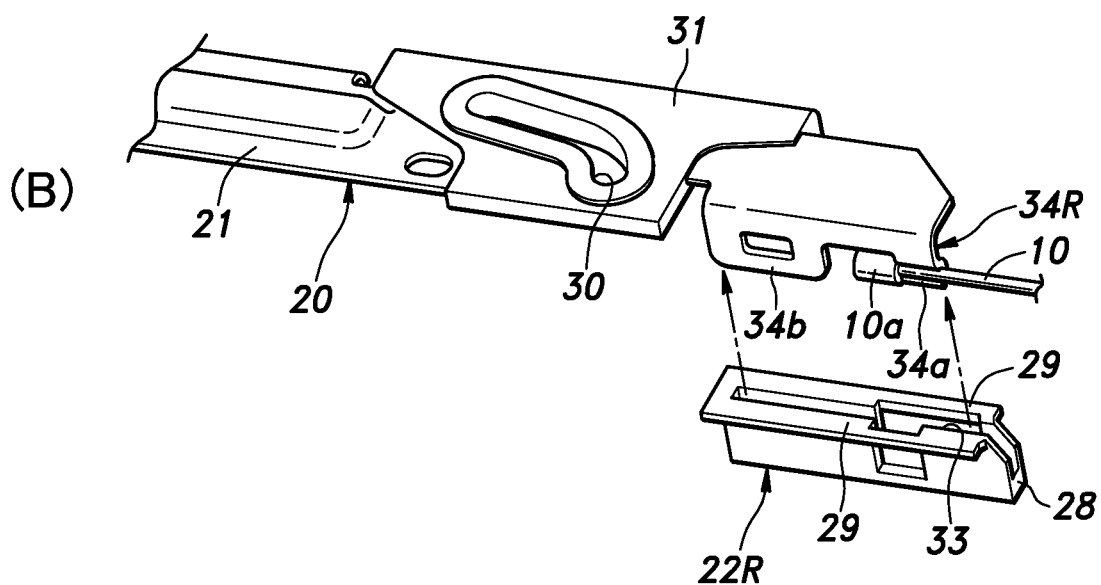
(B)

Fig.9
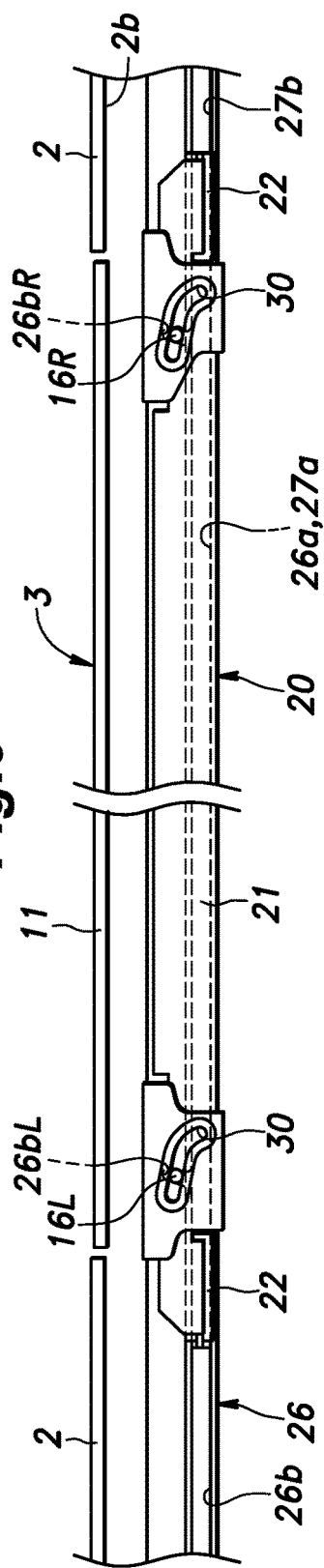
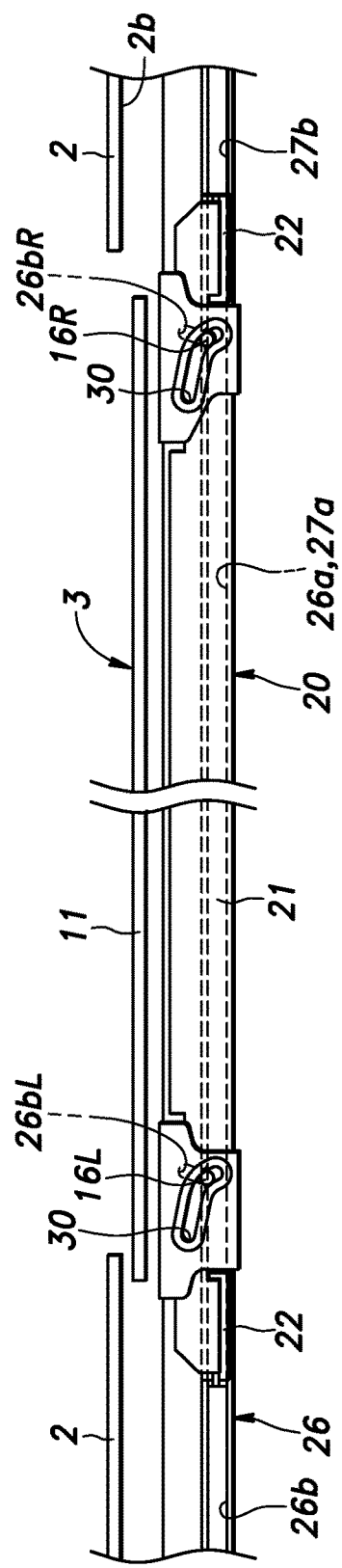
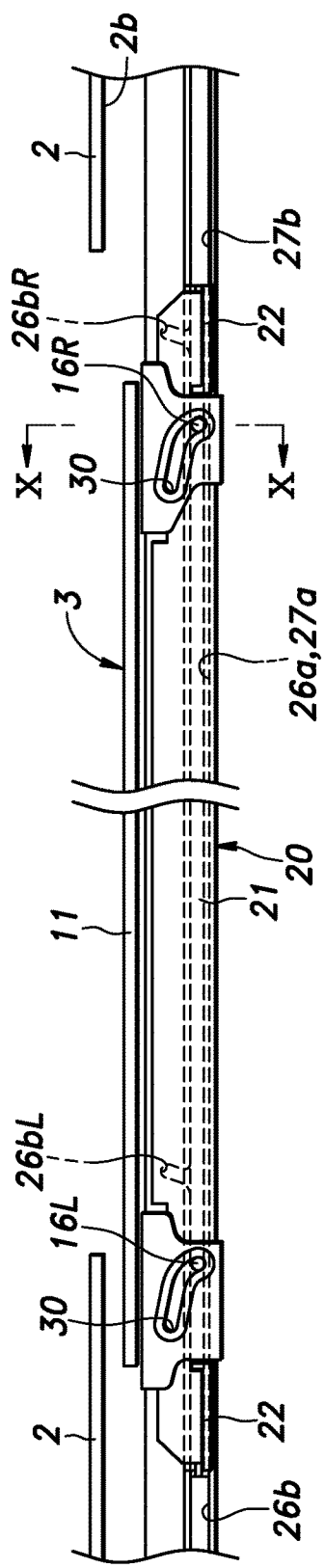

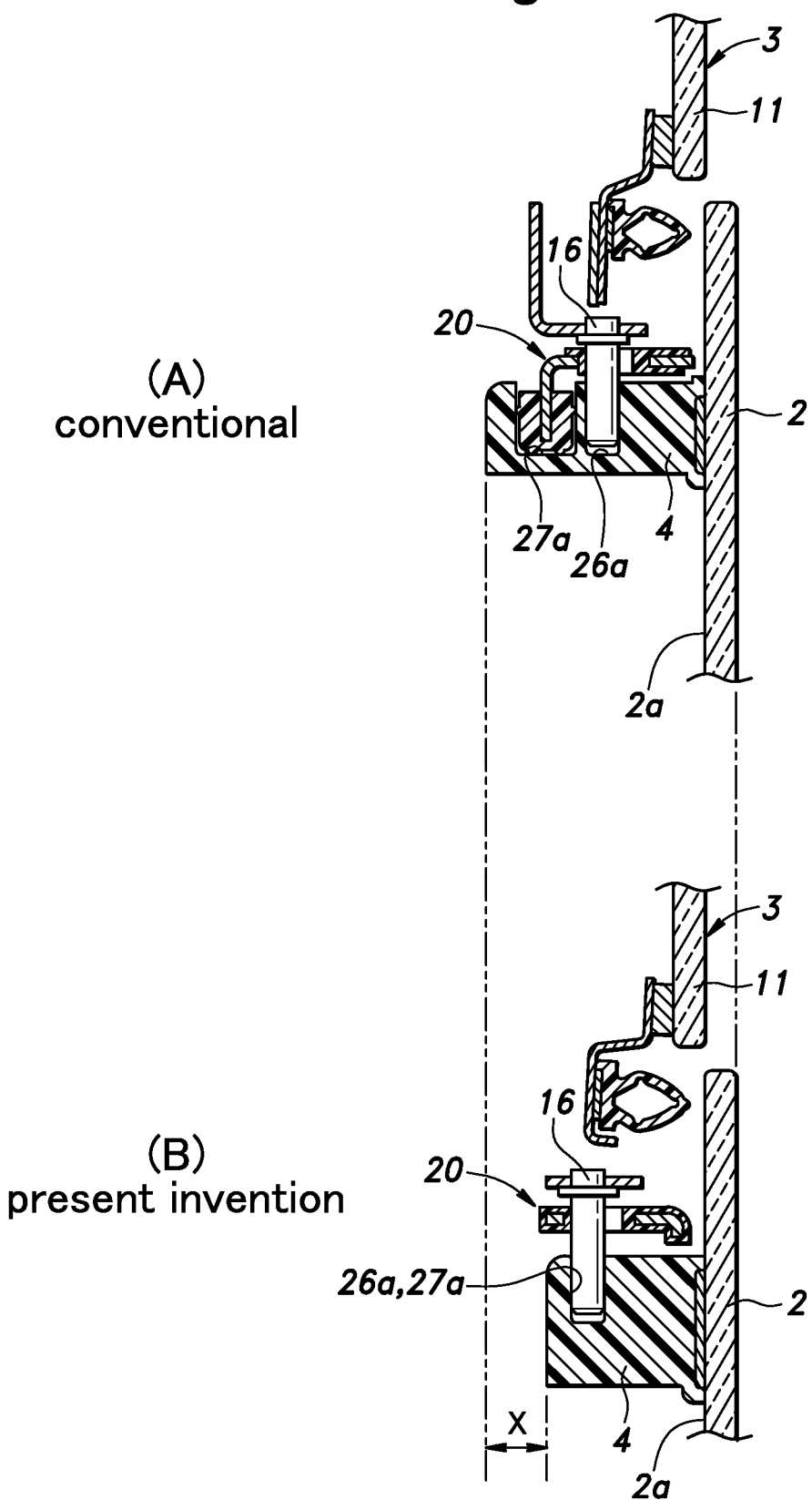

POWER SLIDE WINDOW

CROSS REFERENCE TO RELATED APPLICATIONS

This application is the U.S. National Stage entry of International Application No. PCT/JP2019/027725 filed under the Patent Cooperation Treaty having a filing date of Jul. 12, 2019, which claims priority to Japanese Patent Application No. 2018-143175 having a filing date of Jul. 31, 2018, each of which is incorporated herein by reference.

TECHNICAL FIELD

The present disclosure relates to a power slide window for selectively closing an opening formed in a window glass pane with a slide panel that can be slidably driven by a drive source.

BACKGROUND ART

A power slide window for smoothly opening and closing an opening formed in a window glass pane with a slide panel slidingly driven in a direction along the panel surface of the window glass pane and a direction crossing the panel surface has been proposed by the applicant of the present application (Patent Document 1). In the power slide window described in Patent Document 1, a guide rail is provided along the panel surface of the window glass pane. The guide rail is formed with a slider guide groove for guiding a slider slidingly driven by a drive source and a pin guide groove for guiding a pin provided on the slide panel. The slider guide groove extends along the panel surface in the opening and closing direction. The pin guide groove includes a groove main portion extending along the panel surface in the opening and closing direction and a groove extension portion extending from the groove main portion in a direction to approach the panel surface of the window glass pane. The slider is formed with a pin drive groove extending in a direction crossing the panel surface, and the pin is passed through the pin drive groove to project into the pin guide groove. When the slider is driven along the slider guide groove, the pin driven via the pin drive groove moves in the pin guide groove. The slide panel moves in a direction toward and away from the window glass pane when the pin moves in the groove extension portion, and moves along the panel surface at a position spaced from the window glass pane when the pin moves in the groove main portion.

PRIOR ART DOCUMENT(S)

Patent Document(s)

Patent Document 1: WO2018/047614A1

SUMMARY OF THE INVENTION

Task to be Accomplished by the Invention

However, in the power slide window described in Patent Document 1, the slider guide groove and the pin guide groove are formed side by side in the direction crossing the panel surface of the window glass pane. As a result, the projecting dimension of the guide rail from the panel surface is large.

In view of such background, an object of the present invention is to provide a power slide window in which the projecting dimension of the guide rail from the panel surface is small.

Means to Accomplish the Task

To achieve such an object, one embodiment of the present invention provides a power slide window (1) for opening and closing an opening (2a) provided in a window glass pane (2) with a slide panel (3), the power slide window comprising: a guide rail (4) provided on the window glass pane to define a pin guide groove (26) that extends along a panel surface (2b) of the window glass pane in an opening and closing direction; at least one pin (16) projecting from the slide panel along the panel surface in a direction crossing the opening and closing direction to engage the pin guide groove; a slider (20) slidably provided in a slider guide groove (27) provided in the guide rail and configured to be slidingly driven by a drive source (5) in the opening and closing direction; and at least one pin drive groove (30) formed in the slider to receive the at least one pin, the at least one pin drive groove extending in a direction crossing the panel surface, wherein the pin guide groove includes a groove main portion (26a) extending along the panel surface and at least one groove extension portion (26b) extending from the groove main portion to drive the slide panel in a direction to approach the window glass pane via the at least one pin when the slide panel reaches a vicinity of a closed position, and the groove main portion of the pin guide groove and the slider guide groove are formed at least partially in common with each other.

According to this configuration, when the drive source slidingly drives the slider along the slider guide groove in the opening and closing direction, the drive force is transmitted to the pin projecting into the pin drive groove, and the pin moves along the pin guide groove. Since the pin drive groove extends in the direction crossing the panel surface, movement of the pin in the direction toward and away from the window glass pane is tolerated. The slide panel moves toward and away from the window glass pane when the pin moves in the groove extension portion, and slides in the opening and closing direction when the pin moves in the groove main portion. Further, since the groove main portion of the pin guide groove and the slider guide groove are formed at least partially in common with each other, compared to the case where the groove main portion of the pin guide groove and the slider guide groove formed independently of each other, the projecting dimension of the guide rail from the panel surface can be made small.

Preferably, in the above configuration, the at least one groove extension portion (26b) is connected to an end portion of the groove main portion (26a) on a side of the closed position, the slider guide groove (27) includes a slider-dedicated groove portion (27b) that extends in a direction of extension of the groove main portion beyond the end portion of the groove main portion on the side of the closed position, the slider-dedicated groove portion is formed to be shallower than the groove main portion and the at least one groove extension portion (DS<DR), and the at least one pin (16) has a projection length (LR>DS) larger than a depth (DS) of the slider-dedicated groove portion.

According to this configuration, since the pin has a projection length larger than the depth of the slider-dedicated groove portion, when the pin slides in the closing direction, the pin is reliably guided to the groove extension portion without advancing into the slider-dedicated groove portion from the groove main portion.

Preferably, in the above configuration, the slider (10) includes a main plate member (21) made of metal and at least one sliding member (22) made of resin and attached to the main plate member to project into the slider guide groove (27), the main plate member being provided with the at least one pin drive groove (30), an end portion (10a) of a cable (10) for transmitting power of the drive source (5) is coupled to the slider within the slider guide groove, and the main plate member is provided with at least one bent piece (34) formed by bending, the at least one bent piece projecting into the at least one sliding member and locking the end portion of the cable.

According to this configuration, the drive force of the cable is transmitted to the main plate member via the bent piece, and is further transmitted from the pin drive groove provided in the main plate member to the slide panel via the pin. Therefore, it is unnecessary for the sliding member, which is made of resin, to transmit the drive force, and the sliding member can be made thin. Thereby, the projecting dimension from the panel surface can be further reduced. In addition, it is unnecessary to increase the width of the pin guide groove formed in common with the slider guide groove and/or the diameter of the pin.

Preferably, in the above configuration, the at least one sliding member (22) is provided with a projecting portion (28) projecting into the slider guide groove (27) and a pair of flange portions (29) slidably contacting the guide rail outside the slider guide groove.

According to this configuration, since the sliding member slidably contacts the guide rail on both sides of the slider guide groove, when the sliding member is passing a portion in common with the pin guide groove that is deeper than the slider-dedicated groove portion, the sliding member is prevented from coming off from the main plate member and falling into the deep portion of the pin guide groove.

Preferably, in the above configuration, the at least one pin (16) includes a first pin (16R) provided on a closing direction side of the slide panel (3) and a second pin (16L) provided on an opening direction side of the slide panel, the at least one groove extension portion (26b) includes a first groove extension portion (26bR) connected to the end portion of the groove main portion (26a) on the side of the closed position to guide the first pin when the slide panel reaches the vicinity of the closed position and a second groove extension portion (26bL) connected to a longitudinally intermediate part of the groove main portion to guide the second pin when the slide panel reaches the vicinity of the closed position, the main plate member (21) is provided with two pin drive grooves (30) to drive the first pin and the second pin, the at least one sliding member (22) includes two sliding members (22L, 22R) arranged on both sides of the two pin drive grooves in the opening and closing direction, and the at least one bent piece (34) includes two bent pieces (34L, 34R) locking enlarged diameter portions formed on two end portions of the cables arranged on both sides of the two sliding members in the opening and closing direction.

According to this configuration, the slider is driven by the cables arranged on both sides in the opening and closing direction, and the two bent pieces are each applied the tensile force from the end portion of the corresponding one of the cables arranged on both sides in the sliding direction. Therefore, compared to the case where a push-pull cable is provided on one side in the opening and closing direction, the slider and the slide panel can be driven smoothly and reliably.

Effect of the Invention

Thus, according to the present invention, it is possible to provide a power slide window in which the projecting dimension of the guide rail from the panel surface is small.

BRIEF DESCRIPTION OF THE DRAWINGS

FIG. 7 shows (A) a sectional plan view and (B) a sectional vertical view of the power slide window in the closed state;

FIG. 8 is a diagram illustrating an assembly procedure of a main part of the slider;

FIG. 9 is a plan view for explaining the opening and closing operation of the power slide window; and FIG. 10 is a sectional view taken along line X-X in FIG. 9 and showing (A) the conventional technology and (B) the embodiment in comparison.

MODES FOR CARRYING OUT THE INVENTION

A preferred embodiment of the present invention is described in the following with reference to the appended drawings. The fore and aft, and up and down directions mentioned in the following description are based on the state where the power slide window 1 is mounted on a vehicle, and the right and left directions are based on the view point of a vehicle occupant viewing the power slide window 1 rearward from a front part of the cabin of the vehicle. The front and rear sides may be referred to as inboard side and outboard side with respect to the cabin. The similar components which are arranged in laterally opposing pairs are denoted with numerals with a different suffix R or L appended thereto depending on if the particular component is located in a right part or in a left part. When such components are collectively referred to or when no distinction is required if the particular component is located in an upper part or a lower part, or on a left hand side or a right hand side, the suffix is omitted from the numeral indicating each particular component.

Figure 1:
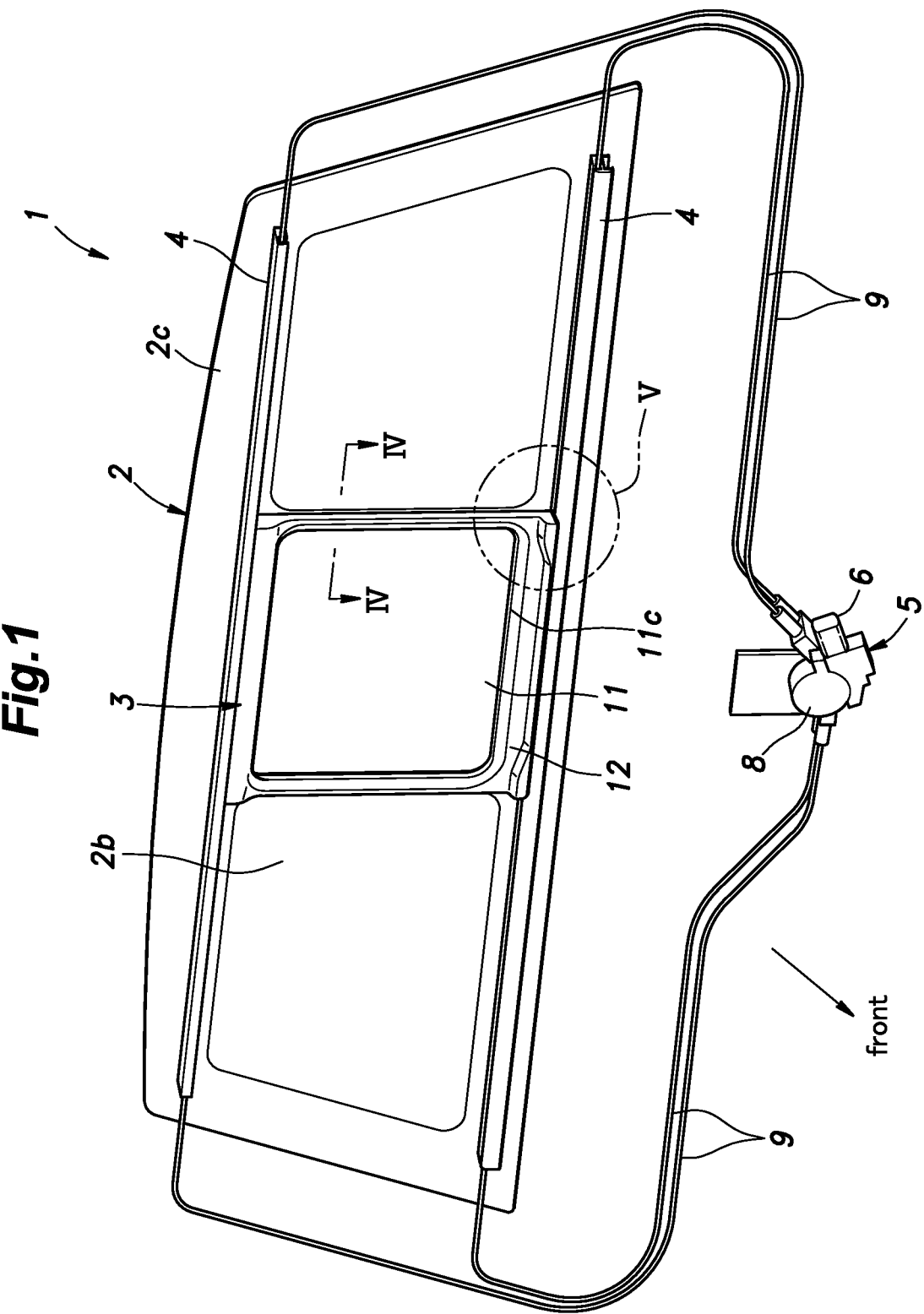
FIG. 1 is a perspective view of an overall structure of a power slide window according to an embodiment of the present invention in a closed state.

FIG. 1 is a perspective view of an overall structure of a power slide window 1 for a vehicle according to an embodiment of the present invention in a closed state as viewed from an upper front part of a passenger compartment of the vehicle. This power slide window 1 is fitted on a rear end of a cabin of a pickup truck as a rear window, and includes a window glass pane 2. The window glass pane 2 extends substantially vertically with the major plane thereof facing in a fore and aft direction, and is provided with a laterally elongated substantially rectangular shape such that the lateral dimension along the major plane is greater than the vertical dimension along the panel surface. The window glass pane 2 is slightly curved along the right and left edges and the upper and lower edges thereof so as to be convex toward the rear.

A rectangular opening 2a (FIG. 2) is formed in a central part of the window glass pane 2, and a rectangular slide panel 3 is provided on the window glass pane 2 so as to close the opening 2a. The outer periphery and the inner periphery around the opening 2a of the window glass pane 2 are formed with light shielding portions 2c on the front surface thereof (which will be referred to as panel surface 2b) by applying a light shielding treatment or by applying a paint containing black pigment (black ceramic coating).

An upper and lower guide rail 4 extending laterally and horizontally in parallel to each other along the panel surface 2b are attached to the corresponding light shielding portions 2c of the window glass pane 2. In particular, the slide panel 3 is configured to be slidable in the lateral direction along the upper and lower guide rails 4.

Figure 2:
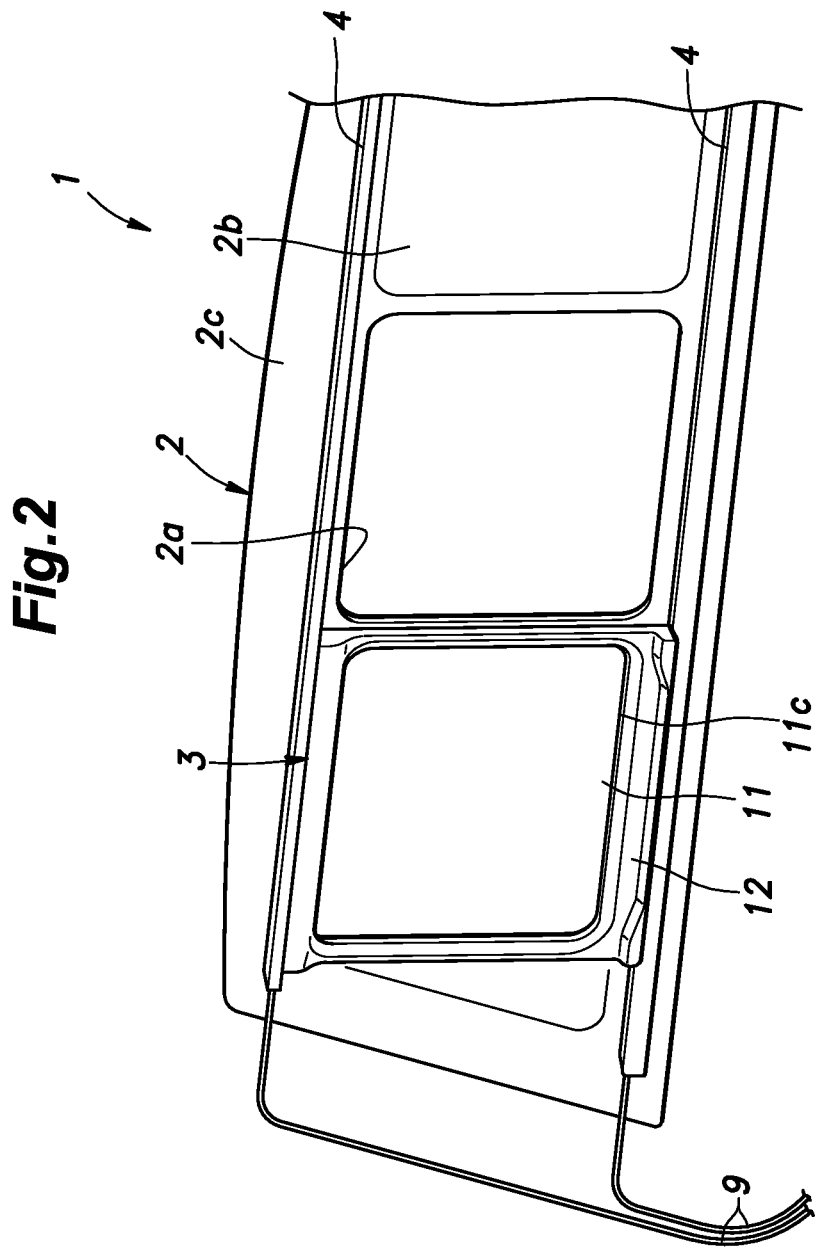
FIG. 2 is a fragmentary perspective view of the power slide window shown in FIG. 1 in an open state.

In the present embodiment, the slide panel 3 is configured to selectively open and close the opening 2a by sliding between a closed position in which the opening 2a is closed as shown in FIG. 1, and an open position in which the opening 2a is opened by sliding from the closed position to the left as shown in FIG. 2. The slide panel 3 in the closed position is positioned in a more forward position (inboard side of the window glass pane 2) than in the open position.

In an alternate embodiment, the slide panel 3 opens only a part of the opening 2a in the open position. In another alternate embodiment, the slide panel 3 is configured to slide to the right from the closed position to open the opening 2a. It is also possible to arrange such that the slide panel 3 is slidable in either lateral direction from the closed position thereof so that the opening 2a may be opened by sliding the slide panel 3 in either lateral direction from the closed position. Also, the slide panel 3 in the closed position may be positioned in a more rearward position (outboard side of the window glass pane 2) than in the open position.

As shown in FIG. 1, a drive source 5 for slidingly driving the slide panel 3 is provided in a part of the vehicle body located under the window glass pane 2. The drive source 5 includes an electric motor 6, a speed reduction mechanism, and a housing 8 that houses the speed reduction mechanism, and is fixedly attached to the vehicle body via the housing 8. Four guide pipes 9 are connected to the housing 8. The two guide pipes 9 located on the right side extend rightward from the housing 8, and are then curved upward before being connected to the upper and lower guide rails 4, respectively, from the right side. The two guide pipes 9 located on the left side extend leftward from the housing 8, and are then curved upward before being connected to the upper and lower guide rails 4, respectively, from the left side.

The two guide pipes 9 connected to the upper guide rail 4 are connected to a relatively front part of the housing 8, and the two guide pipes 9 connected to the lower guide rail 4 are connected to a relatively rear part of the housing 8. The guide pipes 9 slidably receive therein cables 10 (see FIG. 3) for slidingly driving the slide panel 3 by transmitting the drive force of the drive source 5.

The upper cable 10 on the right side and the upper cable 10 on the left side are complementarily wound and unwound (or paid out) by a common pulley having a rotational center line extending in the fore and aft direction. Similarly, the lower cable 10 on the right side and the lower cable 10 on the left side are complementarily wound and unwound (or paid out) by another common pulley. These two pulleys are integrally combined to each other such that the right and left upper cables 10 and the right and left lower cables 10 are wound and unwound by the two pulleys of the drive source 5 in synchronism. These cables serve as a power transmission means for transmitting the drive force of the drive source 5 to the slide panel 3 (via sliders 20 to be more precise as will be described hereinafter).

Figure 3:
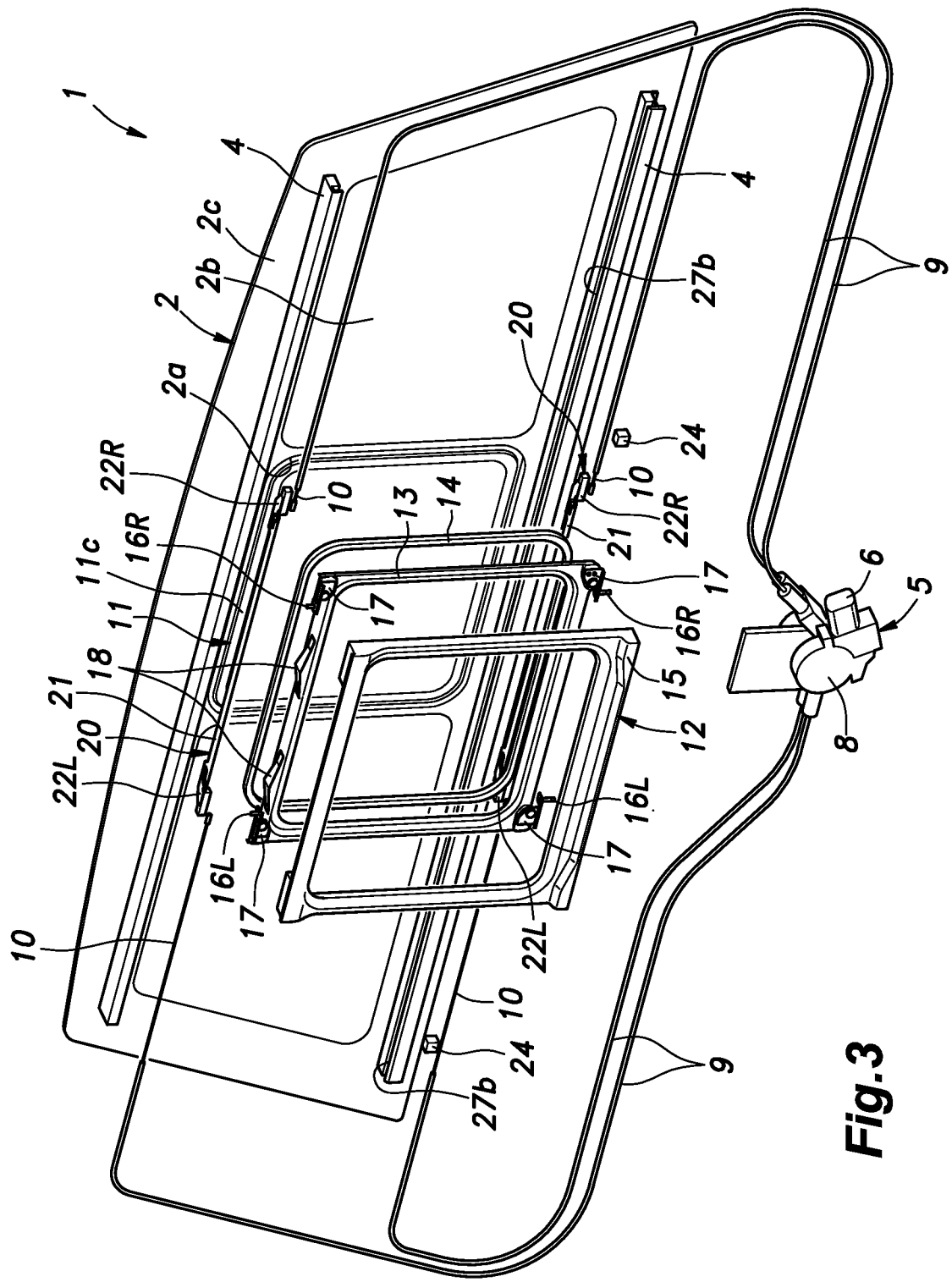
FIG. 3 is an exploded perspective view of the power slide window shown in FIG. 1.
Figure 4:
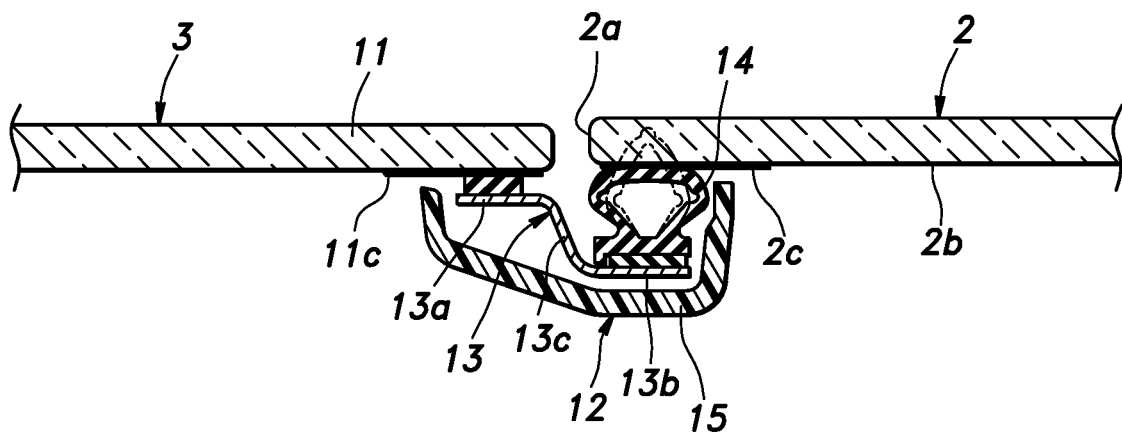
FIG. 4 is a sectional view taken along line IV-IV of FIG. 1.

FIG. 3 is an exploded perspective view of the power slide window 1 shown in FIG. 1. FIG. 4 is a sectional view taken along line IV-IV of FIG. 1. As shown in FIGS. 3 and 4, the slide panel 3 includes a movable glass pane 11 having the same thickness as the window glass pane 2, and a frame 12 provided on the periphery of the movable glass pane 11. The movable glass pane 11 is formed somewhat smaller than the opening 2a of the window glass pane 2, and is arranged parallel to the window glass pane 2 in the opening 2a so as to be flush with the window glass pane 2. The periphery of the movable glass pane 11 is formed with a light shielding portion 11c by applying a light shielding treatment or by applying of a paint containing black pigment (black ceramic coating).

The frame 12 includes a bracket frame 13 joined to the inner surface of the light shielding portion 11c of the movable glass pane 11 via an adhesive. The bracket frame 13 is provided with a rectangular annular shape having an inner contour smaller than the outer contour of the movable glass pane 11 and an outer contour larger than the outer contour of the movable glass pane 11. As shown in FIG. 4, the bracket frame 13 includes an inner portion 13a opposing the movable glass pane 11 at a position relatively close to the inner surface of the movable glass pane 11, and an outer portion 13b opposing the window glass pane 2 (which is flush with the inner surface of the movable glass pane 11) at a position relatively remote from the inner surface of the window glass pane 2, and an intermediate portion 13c connecting the inner portion 13a and the outer portion 13b with each other. Thus, the bracket frame 13 is provided with a crank-shaped cross section.

An annular seal member 14 having a hollow cross-sectional shape is attached to the rear surface of the outer portion 13b of the bracket frame 13 by using an adhesive agent. The seal member 14 is made of an elastic material having a low elastic modulus such as synthetic rubber. When no external force is applied, the seal member 14 has a height greater than the distance from the bracket frame 13 to the inner surface of the window glass pane 2 as shown by the imaginary line in FIG. 4. When the movable glass pane 11 is flush with the window glass pane 2, the seal member 14 is elastically deformed so as to reduce its height as indicated by the solid line in FIG. 3, and the distal end thereof resiliently abuts the inner surface of the window glass pane 2. Thereby, the sealing between the movable glass pane 11 and the window glass pane 2 is ensured.

A front side of the bracket frame 13 is fitted with an annular cover frame 15 that covers the seal member 14 and the bracket frame 13. The cover frame 15 is fixed to the bracket frame 13 at appropriate positions thereof. Thus, the frame 12 including the bracket frame 13, the seal member 14 and the cover frame 15 is provided on the front side (cabin side) of the movable glass pane 11, and extends over the light shielding portion 11c of the movable glass pane 11 and the light shielding portion 2c of the window glass pane 2. As a result, the gap between the peripheral edge of the movable glass pane 11 and the opening edge of the window glass pane 2 is covered by the frame 12 from the cabin side over the entire periphery.

As shown in FIG. 3, left and right end portions of an upper part of the bracket frame 13 are integrally provided with left and right upper pins 16 (16L, 16R), respectively, via pin brackets 17. The upper pins 16 project upward (namely, in a direction crossing the opening and closing direction of the slide panel 3 along the panel surface 2b of the window glass pane 2). Left and right end portions of a lower part of the bracket frame 13 are integrally provided with left and right downward-projecting lower pins 16 (16L, 16R), respectively, via pin brackets 17. The upper right pin 16R on the closing direction side is formed longer than the upper left pin 16L on the opening direction side, and the lower right pin 16R is formed longer than the lower left pin 16L. Further, a pair of upward-projecting leaf springs 18 are provided on the upper surface of the upper part of the bracket frame 13. The leaf springs 18 resiliently contact the lower surface of the upper guide rail 4 to urge the bracket frame 13 downward, and slide along the lower surface of the upper guide rail 4 as the bracket frame 13 slides.

An upper slider 20 is slidably provided in the upper guide rail 4 and a lower slider 20 is slidably provided in the lower guide rail 4. Each slider 20 includes a main plate member 21 which is made of metal and extends along mutually opposing surfaces of the upper and lower guide rails 4 and left and right sliding members 22 (22L, 22R) which are made of resin and are attached to the left and right end portions of the main plate member 21 so as to slidably contact the corresponding guide rail 4.

Each sliding member 22 is connected to the end portion of the corresponding one of the four cables 10 for slidingly driving the slide panel 3. Thereby, the drive force (tensile force) of the drive source 5 is transmitted to the upper slider 20 and the lower slider 20. The main plate member 21 is engaged by the left and right pins 16 on the corresponding upper or lower side. Namely, the slide panel 3 is supported by the upper slider 20 and the lower slider 20 via the left and right upper pins 16 and the left and right lower pins 16. The four cables 10 are connected to the left and right end portions of the upper part and the lower part of the slide panel 3 via the upper slider 20 and the lower slider 20, and transmit the drive force of the drive source 5 to the slide panel 3 via the upper slider 20 and the lower slider 20.

In another embodiment, push-pull cables may be used as the power transmission means to be coupled with one of the left and right sliding members 22L, 22R on the upper side and one of the left and right sliding members 22L, 22R on the lower side, respectively. In this case, the upper and lower push-pull cables may be provided to extend from the upper and lower sliders 20 in only one direction (leftward or rightward). Alternatively, the upper and lower push-pull cables may be provided to extend in one direction from the upper slider 20 and to extend in the other direction from the lower slider 20.

In left portions of the upper and lower guide rails 4, two left stoppers 24 are provided (only the lower one is shown in the drawings) such that, when the slide panel 3 moves leftward, the left stoppers 24 limit the movement of the slide panel 3 at the open position by contacting against the left ends of the corresponding upper and lower sliders 20. Further, in right portions of the upper and lower guide rails 4, two right stoppers 24 are provided (only the lower one is shown in the drawings) such that, when the slide panel 3 moves rightward, the right stoppers 24 limit the movement of the slide panel 3 at the closed position by contacting against the right ends of the corresponding upper and lower sliders 20. Each stopper 24 is provided with an elastic member at least on a contact surface thereof.

The connecting structure between the lower left cable 10 and the slide panel 3 via the slider 20 differs from the connecting structure between the lower right cable 10 and the slide panel 3 via the slider 20 only in that the directions in which the cables 10 extend are opposite to each other, but otherwise the same. The connecting structure between each lower cable 10 and the slide panel 3 via the slider 20 differs from the connecting structure between each upper cable 10 via the slider only in that the connecting structures are vertically symmetrical with respect to a horizontal plane, but otherwise the same. Therefore, as a representative of the connecting structures for the cables 10, the connecting structure between the lower right cable 10 and the slide panel 3 will be described. The term "lower" is omitted in the following description.

Figure 5:
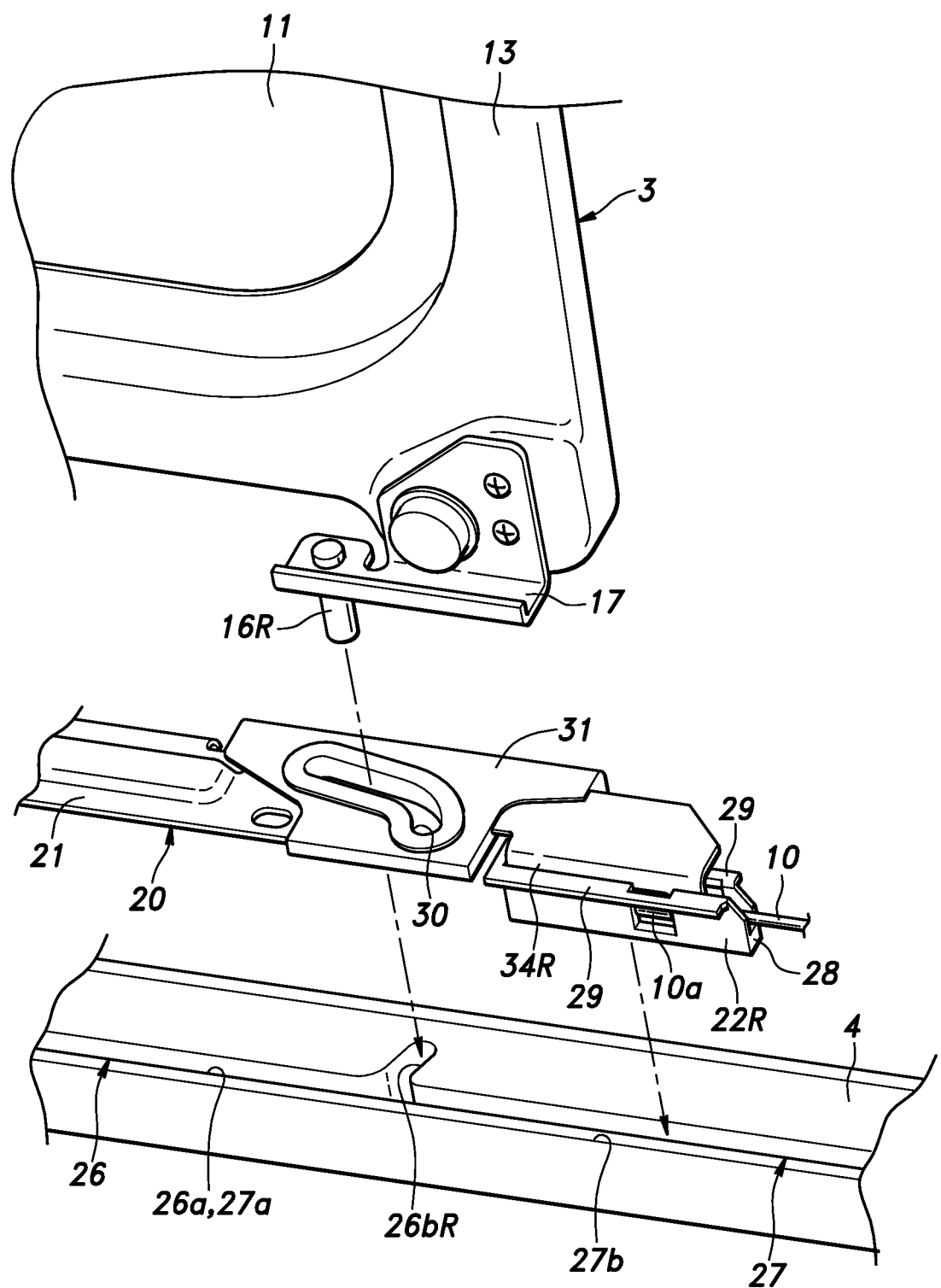
FIG. 5 is an exploded view of a part indicated by V in FIG. 1.
Figure 6:
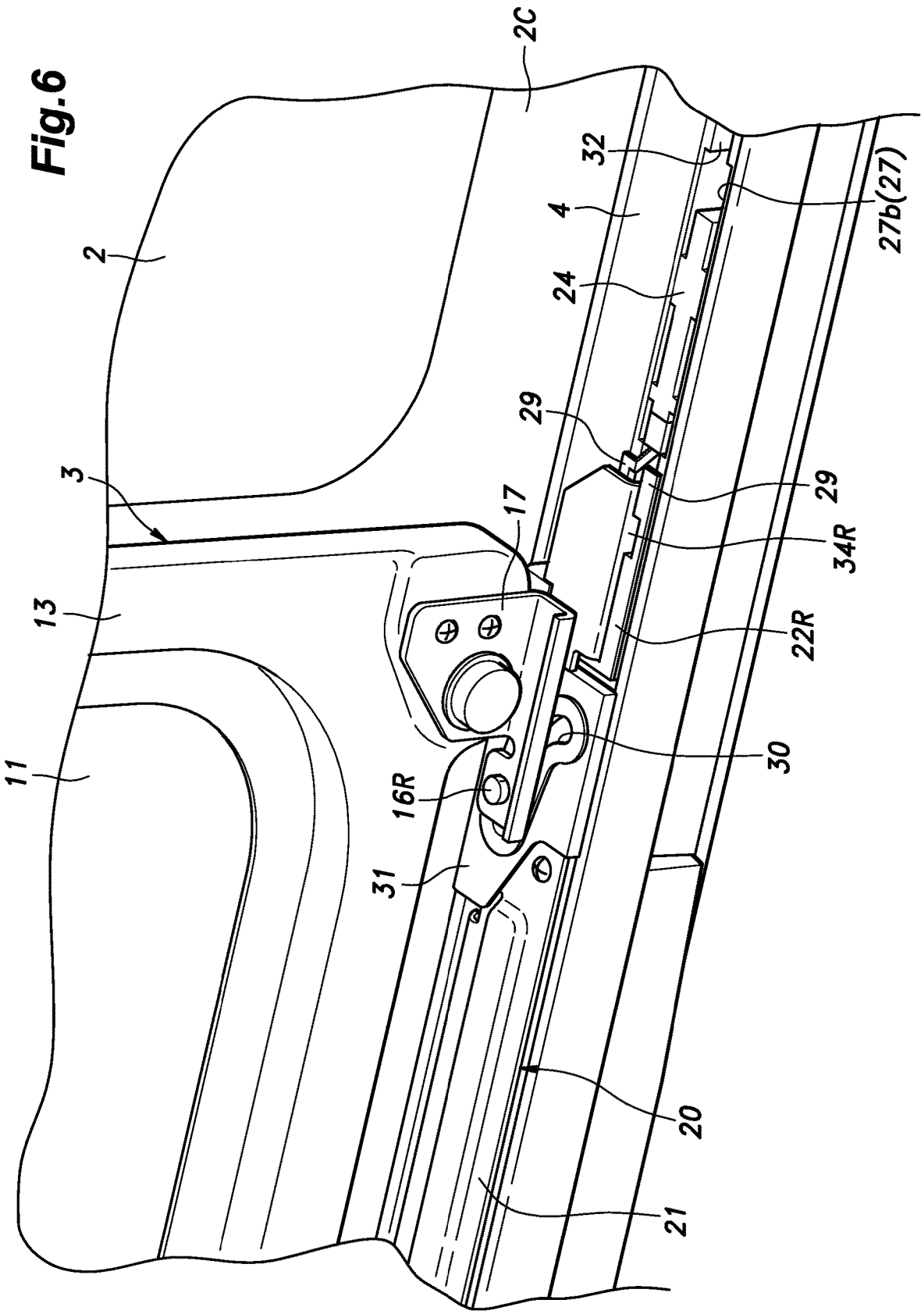
FIG. 6 is an enlarged view of the part indicated by V in FIG. 1.

FIG. 5 is an exploded view of a part indicated by V in FIG. 1, and FIG. 6 is an enlarged view of the part indicated by V in FIG. 1. Note that in FIG. 5 and FIG. 6, the cover frame 15 is omitted. FIG. 7 shows (A) a sectional plan view and (B) a sectional vertical view (sectional view taken along line B-B in (A) of FIG. 7) of the power slide window 1 in the closed state. As shown in FIG. 5 and (A) of FIG. 7, the upper surface of the guide rail 4 (the surface facing the upper guide rail 4) is provided with a pin guide groove 26 configured to receive and guide the pins 16 and a slider guide groove 27 configured to slidably receive the left and right sliding members 22L, 22R of the slider 20.

The pin guide groove 26 includes a groove main portion 26a extending laterally along the guide rail 4. A right groove extension portion 26bR extends continuously from the right end of the groove main portion 26a obliquely in a right rear direction. The right groove extension portion 26bR is curved toward the rear as it extends rightward. A left groove extension portion 26bL extends continuously from a laterally intermediate part of the groove main portion 26a obliquely in a right rear direction. The left groove extension portion 26bL also is curved to the rear as it extends rightward. The right groove extension portion 26bR and the left groove extension portion 26bL are inclined relative to the longitudinal direction of the guide rail 4 and are substantially identical in shape in plan view. However, since the left groove extension portion 26bL extends rearward from the intermediate part of the groove main portion 26a, the left groove extension portion 26bL is shorter than the right groove extension portion 26bR by the amount of overlap with the groove main portion 26a.

The slider guide groove 27 extends laterally along the guide rail 4, is formed to have the same width as that of the groove main portion 26a of the pin guide groove 26, and is arranged at a position overlapping with the groove main portion 26a in the fore and aft direction. Namely, the slider guide groove 27 and the groove main portion 26a of the pin guide groove 26 are formed in common with each other at longitudinally overlapping portions thereof. The slider guide groove 27 is provided with a common groove portion 27a formed in common with the groove main portion 26a of the pin guide groove 26 and a right slider-dedicated groove portion 27b that extends rightward (in the direction of extension of the groove main portion 26a) beyond the right end (or the end portion on the side of the closed position) of the groove main portion 26a. Note that in the present embodiment, the cable 10 also extends from the slider 20 leftward, and therefore, the slider guide groove 27 further includes a left slider-dedicated groove portion 27b (see FIG. 3) that extends leftward (in the direction of extension of the groove main portion 26a) beyond the left end (or the end portion on the side of the open position) of the groove main portion 26a.

As shown in FIG. 5, the sliding member 22 includes a projecting portion 28 projecting into the slider guide groove 27 and a pair of flange portions 29 integrally formed at the upper end of the projecting portion 28 so as to project in the fore and aft direction. The pair of flange portions 29 is formed to be larger than the width of the slider guide groove 27, and slidably contacts the upper surface of the guide rail 4 outside the slider guide groove 27. Thereby, only the projecting portion 28 of the sliding member 22 is received in the slider guide groove 27.

As shown in (A) of FIG. 7, the main plate member 21 of the slider 20 is formed with left and right pin drive grooves 30 through which the corresponding left and right pins 16 project into the pin guide groove 26. Note that to reduce the sliding resistance of the pins 16, a resin member 31 covering the sliding contact part of the pin drive groove 30 is integrally formed on the main plate member 21 by outsert molding. Each pin drive groove 30 extends substantially in the fore and aft direction in the front part of the main plate member 21 and is curved leftward toward the rear (in other words, is curved such that the inclination angle thereof with respect to the fore and aft direction increases toward the rear). Namely, the pin drive groove 30 is inclined in a direction to be spaced further from the window glass pane 2 as it extends from the left to the right, and also extends at an angle both to the fore and aft direction, which is a direction orthogonal to the panel surface 2b of the window glass pane 2, and to the lateral direction, which is the longitudinal direction of the guide rail 4. In the state shown in FIG. 6 and (A) of FIG. 7 or when the slide panel 3 is in the closed position, the right pin 16 is positioned in the vicinity of the left end of the pin drive groove 30 and at the right end of the pin guide groove 26 (the rear end of the groove extension portion 26b).

As shown in FIG. 5, the pin 16 is inserted into the pin guide groove 26 by passing through the pin drive groove 30 of the main plate member 21. Namely, as is also shown in FIG. 6, the pin 16 arranged in such a state is fixed to the slide panel 3 by screwing the pin bracket 17 to the bracket frame 13. The lower right cable 10 (FIG. 5) extends rightward from the right sliding member 22R of the slider 20.

Similarly, as shown in FIG. 3, the lower left cable 10 extends leftward from the left end of the slider 20, the upper left cable 10 extends leftward from the left end of the upper slider 20, and the upper right cable 10 extends rightward from the right end of the upper slider 20.

As shown in FIG. 6, the right stopper 24 is provided in the right slider-dedicated groove portion 27b and is supported by a support wall 32 which is formed so as to project into the slider-dedicated groove portion 27b. The part of the slider guide groove 27 to the right of the support wall 32 receives the guide pipe 9 (see FIG. 3). The free end of the guide pipe 9 abuts the support wall 32, and the lower right cable 10 extending out from the free end of the guide pipe 9 extends to the right sliding member 22R via grooves formed in the support wall 32 and the right stopper 24. The end portion of the cable 10 is held by the right sliding member 22R.

As shown in (B) of FIG. 7, the groove main portion 26a of the pin guide groove 26 is formed with a constant depth. The left groove extension portion 26bL is formed shallower than the groove main portion 26a, the right groove extension portion 26bR is formed to have the same depth as that of the groove main portion 26a. Namely, the left groove extension portion 26bL is formed shallower than the right groove extension portion 26bR. Also, the slider-dedicated groove portion 27b is formed shallower than the groove main portion 26a of the pin guide groove 26.

The depths D of the slider-dedicated groove portion 27b and the pin guide groove 26 and the projection length L of each pin 16 into the pin guide groove 26 are determined to satisfy the following relationship. Namely, the projection length LL of the lower left pin 16L is smaller than the depth DL of the left groove extension portion 26bL, and the projection length LR of the lower right pin 16R is larger than the depth DL of the left groove extension portion 26bL and the depth DS of the slider-dedicated groove portion 27b and smaller than the depth DR of the right groove extension portion 26bR. That is, the following formulae (1) and (2) hold:

$$LL < DL \quad (1)$$

$$DL, DS < LR < DR \quad (2)$$

As a result, the lower left pin 16L can advance into the left groove extension portion 26bL, while the lower right pin 16R cannot advance into the left groove extension portion 26bL and the slider-dedicated groove portion 27b but can advance into the right groove extension portion 26bR. The same relationship holds with regard to the projection length L of each upper pin 16 and the depths D of the corresponding slider-dedicated groove portion 27b and pin guide groove 26.

FIG. 8 is a diagram illustrating an assembly procedure of a main part of the slider 20. As shown in (A) of FIG. 8, the end portion of the cable 10 is formed with an engaging end portion 10a having an enlarged diameter. The right sliding member 22R of the slider 20 is formed with a cable holding groove 33 that opens in the upper surface and extends to the right end thereof. The main plate member 21 extends substantially horizontally and parallel with the upper surface of the guide rail 4 and is provided with left and right bent pieces 34L, 34R (see (A) of FIG. 7) formed by bending downward at the right and left ends thereof. Each bent piece 34 is laterally divided by a cutout formed in a laterally intermediate part thereof. Specifically, the right bent piece 34 includes a cable locking portion 34a curved to hold the cable 10 and arranged to the right of the engaging end portion 10a to engage the right shoulder surface of the engaging end portion 10a, and a sliding member locking portion 34b arranged to the left of the engaging end portion 10a to be engaged by an engagement claw (not shown in the drawings) of the sliding member 22.

As shown in (B) of FIG. 8, with the cable locking portion 34a holding the cable 10 and engaged by the engaging end portion 10a of the cable 10, the right sliding member 22R is put on the bent piece 34. The sliding member locking portion 34b locks the sliding member 22R, whereby the sliding member 22R is fixed to the main plate member 21 and the state shown in FIG. 5 is obtained.

As shown in (B) of FIG. 7, the depths D of the slider-dedicated groove portion 27b and the pin guide groove 26 and the projection length LS of the slider 20 (the sliding member 22) into the pin guide groove 26 are determined to satisfy the following relationship. That is, the depth DS of the slider-dedicated groove portion 27b is larger than the projection length LS of the slider 20 and smaller than the depth of the groove main portion 26a (or the depth DR of the right groove extension portion 26bR). Namely, the following formula (3) holds:

$$LS < DS < DR \quad (3)$$

Thereby, the slider 20 can slide in the slider-dedicated groove portion 27b and the groove main portion 26a of the pin guide groove 26, and is prevented from being engaged by a step portion when advancing into the slider-dedicated groove portion 27b from the groove main portion 26a.

As described above, the lower cable 10 on the right side and the lower cable 10 on the left side which are wound on and unwound from the same pulley in a complemental manner constitute a lower drive cable that slidingly drives the lower portion of the slide panel 3. Similarly, the upper cable 10 on the right side and the upper cable 10 on the left side which are wound on and unwound from the same pulley in a complemental manner constitute an upper drive cable that slidingly drives the upper portion of the slide panel 3.

FIG. 9 is a plan view for explaining the opening and closing operation of the power slide window 1, in which (A) shows the state where the slide panel 3 is in the closed position, (B) shows the state where the slide panel 3 is substantially in front of the closed position, and (C) shows the state where the slide panel 3 is in front of and to the left of the closed position. When the slide panel 3 is to be opened, the state of the power slide window 1 progresses from (A) to (C) of FIG. 9. Conversely, when the slide panel 3 is to be closed, the state of the power slide window 1 progresses from (C) to (A) of FIG. 9.

As shown in (A) of FIG. 9, when the slide panel 3 is in the closed position and flush with the window glass pane 2, the pins 16 (16L and 16R) are each positioned at the rear end (left end) of the corresponding pin drive groove 30 of the main plate member 21 and are each positioned at the rear end of the corresponding groove extension portion 26b of the pin guide groove 26. Under this condition, when the cables 10 are complementarily wound and unwound in the leftward direction and the slider 20 is slidingly driven to the left, the state shown in (B) of FIG. 9 is achieved. At this time, the left and right pins 16 are driven forward by the slider 20 along the respective pin drive grooves 30, and are moved forward and leftward along the respective groove extension portions 26b of the pin guide groove 26. As a result, the entire slide panel 3 undergoes a sliding movement such that the slide panel 3 moves initially forward or in the direction away from the window glass pane 2 and then leftward or in the direction parallel with the panel surface 2b while maintaining an attitude in parallel with the window glass pane 2. In the state shown in (B) of FIG. 9, the rear surface of the movable glass pane 11 is positioned ahead of the panel surface 2b of the window glass pane 2.

Thereafter, when the cables 10 are complementarily wound and unwound further in the leftward direction and the slider 20 is slid to the left, the state shown in (C) of FIG. 9 is achieved. At this time, the left and right pins 16 move to the left along the pin guide groove 26 while being positioned at the front ends of the corresponding pin drive grooves 30. As a result, the entire slide panel 3 slides to the left. In this way, by forming the pin drive groove 30 elongated in the fore and aft direction in the main plate member 21, the slide panel 3 can be caused to slide in the fore and aft direction without changing the positions of the slider 20 and the cables 10 in the fore and aft direction.

The open position of the slide panel 3 is defined as the position at which the opening 2a of the window glass pane 2 is entirely opened up as shown in FIG. 2. When the slide panel 3 is in the open position, the right pin 16R is positioned in a part of the groove main portion 26a located to the left of the left groove extension portion 26bL.

When the slide panel 3 is in the open position, by causing the cables 10 to be complementarily wound and unwound in the rightward direction, the slider 20 is slidingly driven to the right. At this time, the slide panel 3 slides rightward from the fully open position, such that the closed position shown in (A) of FIG. 9 is restored via the states shown in (C) of FIG. 9 and (B) of FIG. 9.

As was explained with reference to (B) of FIG. 7, the projection length LR of the right pin 16R is larger than the depth DL of the left groove extension portion 26bL. Therefore, when the right pin 16R passes the branching part (adjacent to the left groove extension portion 26bL) between the groove main portion 26a and the left groove extension portion 26bL during the movement of the slide panel 3 to the closed position, the right pin 16R is prevented from advancing into the left groove extension portion 26bL.

Also, as described above, the projection length LR of the right pin 16R is larger than the depth DS of the slider-dedicated groove portion 27b. Therefore, when the right pin 16R passes the branching part between the slider-dedicated groove portion 27b and the right groove extension portion 26bR during the movement of the slide panel 3 to the closed position, the right pin 16R is prevented from advancing into the slider-dedicated groove portion 27b.

As described above, in the power slide window 1 of the present embodiment, as the pins 16 move in the groove extension portions 26b, the slide panel 3 is slidingly driven in a direction crossing the panel surface 2b of the window glass pane 2, as shown in (A) and (B) of FIG. 9. As the pins 16 move in the groove main portion 26a shown in (B) and (C) of FIG. 9, the slide panel 3 is slidingly driven in a direction along the panel surface 2b of the guide rail 4. Owing to these actions, the slide panel 3 is enabled to smoothly slide between the closed position and the open position to close and open the opening 2a.

FIG. 10 is a sectional view taken along line X-X in FIG. 9 and showing (A) the conventional technology and (B) the embodiment in comparison. In this embodiment, the common groove portion 27a of the slider guide groove 27 and the groove main portion 26a of the pin guide groove 26, which are provided in the guide rail 4, are formed in common with each other. Namely, the slider guide groove 27 and the groove main portion 26a of the pin guide groove 26 are made at least partially in common with each other. Therefore, compared to conventional structure in which the slider guide groove 27 and the groove main portion 26a of the pin guide groove 26 are formed in parallel, the projecting dimension of the guide rail 4 from the panel surface 2b can be reduced by a difference X.

Also in the present embodiment, as shown in FIG. 8, the engaging end portion 10a of the cable 10 for transmitting the power of the drive source 5 is coupled to the slider 20 within the slider guide groove 27. Further, the main plate member 21 of the slider 20 is provided with the bent piece 34 formed by bending to project into the sliding member 22 and to lock the engaging end portion 10a of the cable 10. Therefore, the sliding member 22 made of resin does not need to transmit the drive force, and the thickness of the sliding member 22 can be reduced. Thereby, the projecting dimension of the guide rail 4 from the panel surface 2b can be further reduced. In addition, it is unnecessary to increase the width of the pin guide groove 26 formed in common with the slider guide groove 27 and/or the diameter of the pin 16.

In the present embodiment, as shown in FIG. 5, the sliding member 22 is provided with the projecting portion 28 and the pair of flange portions 29. Therefore, when the sliding member 22 is passing the common groove portion 27a, which is a portion in common with the pin guide groove 26 that is deeper than the slider-dedicated groove portion 27b, the sliding member 22 is prevented from coming off from the main plate member 21 and falling into the deep portion of the pin guide groove 26.

In the illustrated embodiment, as shown in FIGS. 3 and 7, the slide panel 3 is provided with the right pin 16R on the right side which is on the side of the closed position, and the left pin 16L on the left side which is on the side of the open position. The right end of the groove main portion 26a continues with the right groove extension portion 26bR where the right pin 16R is located when the slide panel 3 is in the closed position, and the lengthwise intermediate part of the groove main portion 26a continues with the left groove extension portion 26bL where the left pin 16L is located when the slide panel 3 is in the closed position. Therefore, as the right pin 16R and the left pin 16L move in the right groove extension portion 26bR and the left groove extension portion 26bL, respectively, the drive force directed to cause the slide panel 3 to move toward and away from the panel surface 2b of the window glass pane 2 acts upon the right-hand side and the left-hand side of the slide panel 3. As a result, the sliding movement of the slide panel 3 between the closed position and the open position can be effected in a smooth manner.

In addition, the slider 20 is provided with the left and right sliding members 22L, 22R, and the main plate member 21 is provided with the two bent pieces 34L, 34R configured to lock the engaging end portions 10a, which are formed as enlarged diameter portions, of the two cables 10 arranged on the left and right sides of the left and right sliding members 22L, 22R, respectively. Namely, the slider 20 is driven by the cables 10 arranged on the both sides in the opening and closing direction, and the two bent pieces 34 are each applied a tensile force from the corresponding cable 10. Therefore, compared to the case where a push-pull cable is provided on one side in the opening and closing direction, the slider 20 and the slide panel 3 can be driven smoothly and reliably.

Although the present invention has been described in terms of a concrete embodiment, the present invention is not limited to the above-described embodiment, but can be modified in various ways. For example, the power slide window 1 was applied to the rear window of a pickup truck as an example in the above embodiment, but may also be applied to a rear window or a side window of a minivan or the like. Also, the various structures, positions, numbers and angles of the various members and portions may be freely modified without departing from the spirit of the present invention. The various components of the illustrated embodiment are not necessarily essential for the present invention, but can be selectively omitted without departing from the spirit of the present invention.

GLOSSARY 1 power slide window
2 window glass pane
2a opening
2b panel surface
3 slide panel
4 guide rail
5 drive source
10 cable
10a engaging end portion
16 pin
16L left pin (second pin)
16R right pin (first pin)
20 slider
21 main plate member
22 sliding member
22L left sliding member
22R right sliding member
26 pin guide groove
26a groove main portion
26bL left groove extension portion (second groove extension portion)
26bR right groove extension portion (first groove extension portion)
27 slider guide groove
27a common groove portion
27b slider-dedicated groove portion
28 projecting portion
29 flange portion
30 pin drive groove
34 bent piece
34L left bent piece
34R right bent piece
DR depth of groove main portion 26a and right groove extension portion 26bR
DS depth of slider-dedicated groove portion 27b
LR projection length of right pin 16R

The invention claimed is:

1. A power slide window for opening and closing an opening provided in a window glass pane with a slide panel, the power slide window comprising:
 a guide rail provided on the window glass pane to define a pin guide groove that extends along a panel surface of the window glass pane in an opening and closing direction;
 at least one pin projecting from the slide panel along the panel surface in a direction crossing the opening and closing direction to engage the pin guide groove;
 a slider slidably provided in a slider guide groove provided in the guide rail and configured to be slidingly driven by a drive source in the opening and closing direction; and
 at least one pin drive groove formed in the slider to receive the at least one pin, the at least one pin drive groove extending in a direction crossing the panel surface,
 wherein the pin guide groove includes a groove main portion extending along the panel surface and at least one groove extension portion extending from the groove main portion to drive the slide panel in a direction to approach the window glass pane via the at least one pin when the slide panel reaches a vicinity of a closed position,
 the groove main portion of the pin guide groove and the slider guide groove are formed to have same widths as each other in the direction crossing the panel surface and arranged at positions overlapping with each other in the opening and closing direction so as to be made at least partially in common with each other in the opening and closing direction,
 the at least one groove extension portion is connected to an end portion of the groove main portion on a side of the closed position,
 the slider guide groove includes a slider-dedicated groove portion that extends in a direction of extension of the groove main portion beyond the end portion of the groove main portion on the side of the closed position,
 the slider-dedicated groove portion is formed to be shallower than the groove main portion and the at least one groove extension portion, and the at least one pin has a projection length larger than a depth of the slider-dedicated groove portion.

2. The power slide window according to claim 1, wherein the slider includes a main plate member made of metal and at least one sliding member made of resin and attached to the main plate member to project into the slider guide groove, the main plate member being provided with the at least one pin drive groove,
- an end portion of at least one cable for transmitting power of the drive source is coupled to the slider within the slider guide groove, and
- the main plate member is provided with at least one bent piece formed by bending, the at least one bent piece projecting into the at least one sliding member and locking the end portion of the at least one cable.

3. The power slide window according to claim 2, wherein the at least one sliding member is provided with a projecting portion projecting into the slider guide groove and a pair of flange portions slidably contacting the guide rail outside the slider guide groove.

4. The power slide window according to claim 2, wherein the at least one pin includes a first pin provided on a closing direction side of the slide panel and a second pin provided on an opening direction side of the slide panel,
- the at least one groove extension portion includes a first groove extension portion connected to the end portion of the groove main portion on the side of the closed position to guide the first pin when the slide panel reaches the vicinity of the closed position and a second groove extension portion connected to a longitudinally intermediate part of the groove main portion to guide the second pin when the slide panel reaches the vicinity of the closed position,
- the main plate member is provided with two pin drive grooves to drive the first pin and the second pin,
- the at least one sliding member includes two sliding members arranged on both sides of the two pin drive grooves in the opening and closing direction,
- the at least one cable includes two cables arranged on both sides of the two sliding members in the opening and closing direction, and
- the at least one bent piece includes two bent pieces locking enlarged diameter portions formed on two end portions of the two cables.

5. A power slide window for opening and closing an opening provided in a window glass pane with a slide panel, the power slide window comprising:
- a guide rail provided on the window glass pane to define a pin guide groove that extends along a panel surface of the window glass pane in an opening and closing direction;
- at least one pin projecting from the slide panel along the panel surface in a direction crossing the opening and closing direction to engage the pin guide groove;
- a slider slidably provided in a slider guide groove provided in the guide rail and configured to be slidingly driven by a drive source in the opening and closing direction; and
- at least one pin drive groove formed in the slider to receive the at least one pin, the at least one pin drive groove extending in a direction crossing the panel surface,
- wherein the pin guide groove includes a groove main portion extending along the panel surface and at least one groove extension portion extending from the groove main portion to drive the slide panel in a direction to approach the window glass pane via the at least one pin when the slide panel reaches a vicinity of a closed position,
- the groove main portion of the pin guide groove and the slider guide groove are formed to have same widths as each other in the direction crossing the panel surface and arranged at positions overlapping with each other in the opening and closing direction so as to be made at least partially in common with each other in the opening and closing direction,
- the slider includes a main plate member made of metal and at least one sliding member made of resin and attached to the main plate member to project into the slider guide groove, the main plate member being provided with the at least one pin drive groove,
- an end portion of at least one cable for transmitting power of the drive source is coupled to the slider within the slider guide groove,
- the main plate member is provided with at least one bent piece formed by bending, the at least one bent piece projecting into the at least one sliding member and locking the end portion of the at least one cable, and
- the at least one sliding member is provided with a projecting portion projecting into the slider guide groove and a pair of flange portions slidably contacting the guide rail outside the slider guide groove.

* * * * *